United States Patent Office 3,431,112
Patented Mar. 4, 1969

3,431,112
FOOD BAR AND METHOD FOR MAKING
Jack R. Durst, Osseo, Minn., assignor to The Pillsbury Company, Minneapolis, Minn., a corporation of Delaware
No Drawing. Filed Feb. 15, 1965, Ser. No. 432,821
The portion of the term of the patent subsequent to June 6, 1984, has been disclaimed
U.S. Cl. 99—1        12 Claims
Int. Cl. A23l 1/00, 1/40

ABSTRACT OF THE DISCLOSURE

A compact, solid food unit characterized as possessing hardness, frangibility and water dispersible characteristics is imparted by utilization of a binder which provides a structural matrix for discrete edible food particles. The binder is comprised of a discontinuous phase of fat globules encapsulated by a continuous phase of water and a hydrophilic film former.

This invention relates to a compact, highly nutritious food unit adapted to be eaten without further preparations or dispersed in water to form a soup. More particularly, it relates to a compact, nutritious food bar comprising edible particles held together with a binder. The binder is comprised of an edible oil or a normally solid fat, a film-former and water.

It has long been desirable to provide a compact, nutritious food bar. Such bars are particularly suitable as a component of a food packet to be used, for example, by soldiers or campers. Both need a nutritious food that requires a minimum amount of space and is sturdy enough to withstand rough handling and it goes without saying the more palatable the food bar, the better it is. A compact, nutritional food bar also provides advantages in shipment and storage. That advantage is particularly important since use by the military in many cases requires extended shipment under vigorous handling conditions.

The prior art is represented by U.S. Patents 2,170,155 and 2,278,466, both issued to A. Musher. Each of the two patents discloses a compact food bar or brick that consists of edible particles and a binder. The binder is essentially an edible fat and the fat component is the substance that binds the edible particles together.

When a food bar, such as disclosed by Musher, is mixed with water or milk to form a soup, the fat is released and rises conspicuously to the surface. Thus the fat is unstable in a water system and when released, forms an unsightly and undesirable fat layer on the surface of the soup.

The present invention provides a bar containing fat which does not separate in water, that is the fat component is water stable. In addition, it provides a food bar having a storage life, strength and nutritional properties which improve over the prior art.

Accordingly, it is the object of the present invention to provide a food bar consisting of edible particles; bound together by means of a dispersion comprising fat, a film-former and water capable of being mixed with water without release of fat.

It is an additional object to provide a nutritious food bar which contains a minimum of about four calories per gram.

It is a further object to provide a food bar in which the caloric content can be easily controlled.

It is a further object to provide a food bar in which the protein, fat, carbohydrate, ash and vitamin content can easily be controlled.

It is a further object to provide a food bar that is resistant to vigorous handling.

It is a further object to provide a food bar that can be eaten without further preparation or mixed with an edible liquid to form a soup.

It is a further object to make a food bar which has an improved storage life and more particularly, a storage life of at least 3 months at 100° F.

It is another object to produce a food bar at lower pressures than heretofore required.

An important feature of the invention is the provision for subdividing the fat into droplets and encapsulating the fat droplets within the film-former which provides a continuous relatively impervious protective layer over each droplet.

The product of the present invention comprises a binder consisting of a film former as a continuous phase or encapsulating material and a normally solid fat or oil. In one form of the invention edible food particles are distributed through the binder. The edible food particles may be either in flake, shredded, fibrous or powdered form and they provide the primary flavor and texture of the food bar. Examples of edible food particles that are contemplated by the present invention are: corn flakes, wheat flakes, rice, oats, graham cracker pieces, rice krispies, potato flakes, dried meat, vegetables, chocolate flakes or particles, cheese particles, ground peanuts, meat particles, raisins, dried fruit particles, fish, pregelatinized tapioca starch, and seasonings such as onion particles, pepper, salt, celery and monosodium glutamate.

A good number of other edible particles may be used by those skilled in the art, as long as the particles are in flake, shredded, fibrous or particulate form.

The dispersion or binder is made up of an edible oil or a normally solid fat which is melted during formulation and a film-former. Water is used during formulation but much or all of it is ordinarily removed to form the finished product. The edible oil may consist of any edible vegetable or animal oil or mixtures therein or normally solid fat and includes cottonseed oil, corn oil, lard, peanut oil, soy oil, safflower oil, butter or margarine.

The film-former may consist of any edible substance that will form a film around the edible oil using any known process, as for example, vigorous mixing in an aqueous suspension, coacervation, spray drying a fat suspension in a film-former and water solution or by coating fat particles that have been chilled to a hard and non-tacky condition. Other methods will be apparent to those skilled in the art. Film-formers include nonfat milk solids, sodium caseinate, soy protein, egg albumen, egg yolk, wheat germ, gelatine, pea flour, bean flour, corn germ, agar-agar, whey, gelatinized starch, fish protein, bran protein, gum arabic and other hydrophilic colloids, such as carboxymethyl cellulose. Minor amounts of modifiers can be added to the film-former if desired. Among such modifiers are salts, polysaccharides such as sucrose or lactose and polyhydric alcohols such as glycerin.

Water is used to plasticize the film-former. With the film-former in a plastic state, vigorous mixing of the oil and film-former results in the formation of an oil and film-former dispersion. The dispersion consists of fat globules encapsulated in the film-former. The oil is the discontinuous phase, and the film-former is the continuous phase. The dispersion serves as a binder in the formation of the food bar from edible particles.

Because the fat is encapsulated, there is no release of fat when the food bar is placed in water or milk to make a soup. Thus the oil, film-former, water mixture must be mixed until encapsulation is complete. A convenient test for determining when the constituents have been sufficiently mixed is as follows: Remove one drop of the dispersion or binder and place it in 250 ml. of water at 140° F. If fat is released, mixing is not complete and should be continued until the test procedure may be followed without the release of fat. The release of fat in the water system is a visual determination that can be readily made by those skilled in the art.

The proportions of the various constituents (edible particles, binder and water) may vary considerably. The proportion of the constituents (oil and film-former) making up the binder may also vary. In general, however, the upper limit of edible particles is about 80% by weight of the food bar. The preferred upper limit is about 75%. The lower limit of edible particles in the food bar is about 10% when the edible particles comprise a nutritive food or a filler and about .25% to .5% of the weight of the bar when the edible particles comprise a flavoring or flavor imparting concentrate, but it is preferred that the bar contain from about 30 to about 75% by weight of edible particles.

Most preferred bar compositions have a density greater than .5 gm. per cc. Water is preferably used in the amount of about 5% by weight of the bar and preferably from 2–6%.

Binder (oil and film-former) should be provided in a quantity that comprises about 20–99.75% by weight of the bar.

The upper limit of fat in the binder is about 80% of the weight of the binder and the lower limit is about 10%. The dry weight of the film-former exclusive of fillers as extenders can comprise about 5–90% of the dry weight of the binder and preferably between 15 and 35% of the binder. Water should be present in the amount of from about 3% if the binder is dry to 50% if the binder is hydrated. Generally, it is preferred that the finished bar contain less than 10% moisture and the optimum moisture content is about 5% by weight based on the total weight of the food bar but up to 20% can be used if desired but when such large amounts of water are used enzymatic or bacterial degradation can be a problem in long term storage.

In one preferred manufacturing process an aqueous dispersion is made by adding the film-former, fat and sucrose to a minimum amount of water (the least amount required to produce a suspension) which is ordinarily about 15 parts of water per 100 parts of solids. Mixing can be carried out in any conventional mixer such as a Hamilton Beach or Hobart mixer until a thick gel is formed. When food particles are used in the formulation, about 20% of the hydrated binder is mixed with about 80% of the solid food particles on a weight basis and the resulting mixture is either formed or subjected to substantial pressure if greater hardness is desired into the shape of a food bar. The product is then ready for packaging but, if desired, it can be dried by placing it in a oven prior to packaging.

In another preferred process in accordance with the invention the preparation of the binder is begun in the same manner described in the preceeding paragraph except that 50 parts of water are used rather than 15 parts. More or less water can be used to properly adjust the viscosity of the resulting dispersion until it can be pumped to a spray drier of a suitable known construction such as a spray drier manufactured by the Blaw-Knox Company to produce a white, free-flowing powder. If food particles are used in the composition the powder is dry blended with the food particles at this point. The binder with or without food particles is then mixed with the minimum amount of water required to cause the surfaces thereof to become adhrent, i.e., tacky. The particles are then placed in a press and subjected to pressure to form a food bar. Since the moisture level of the finished bar is relatively low no further drying is required in most instances. Moreover, the hardness of the finished product can be more precisely controlled than products manufactured in accordance with the preceding paragraph. The product formed in accordance with this second manufacturing procedure also has the advantage of rehydrating more readily and more quickly. As a result they can be more easily chewed and more easily mixed with water if they are to be used as a rehydrated food such as soup, pudding or a beverage as the case may be.

When the bar is to be formed, the binder and edible food particles are mixed and placed in a mold cavity of suitable known construction. The molding pressure can vary from about 25 to 1000 p.s.i. and preferably between about 250 to 750 p.s.i. The molding time can vary from about .25 second to any desired time period. For most purposes, from about 1–10 seconds is preferred.

The invention may be appropriately illustrated by the following examples in which all amounts are set forth as percentages by weight.

EXAMPLE I

The following binder formulation was made:

| | Percent |
|---|---|
| Nonfat milk solids | 14.8 |
| Lard flakes | 14.8 |
| Sucrose | 18.7 |
| Water | 51.7 |

The lard flakes were heated in a steam jacketed kettle to 160° F. to completely melt them. The nonfat milk solids and sucrose were added and mixed with the melted lard flakes. About half (53.6%) of the water was added with rapid agitation. The mixture was then pumped through an impeller mixer known as an Oakes mixer which is manufactured by the Oakes Co., Inc., of Islip, N.Y., and agitated for 35 minutes. The remainder of the water was added to reduce the viscosity for spray drying. The material was pumped under pressure of 1000 to 1200 p.s.i. through a spray nozzle of a horizontal spray dryer manufactured by the Blaw-Knox Mfg. Co., Inc., of Pittsburgh, Pa. The inlet air temperature was 230°–240° F. and the outlet air temperature was 170°–175° F. The resulting product was a stable, free flowing white powder.

The spray dried dispersion was used to form a food bar consisting of: edible particles 52%, binder 45%, water 3% according to the following procedure. Food bars were made in which corn flakes, wheat flakes, rice krispies, and graham crackers comprised the edible particles. The edible particles and binder were mixed at high speed, using a Hobart mixer for a period of three to four minutes, until the maximum dimension of the edible particles was 1/16 to 1/8". The Hobart mixer was set at No. 2 speed and the water was slowly added while mixing continued. 40 gram units of the resulting free flowing mixture were placed into 2" x 4" dies and pressed into a bar under 125 p.s.i. pressure. Upon release from the die, the bars were satisfactory, but after drying for 20 minutes in an air circulating oven at 50° C., their cohesive strength was improved.

EXAMPLE II

A binder formulation was made as follows:

| | Percent |
|---|---|
| Nonfat milk solids | 25.8 |
| Cottonseed oil | 25.8 |
| Sucrose | 25.8 |
| Glycerin | 6.5 |
| Water | 16.1 |

The stable dispersion was formed by placing the cottonseed oil in a Waring Blendor, adding the nonfat milk solids and sucrose and mixing. The glycerin was dissolved in the water and the solution was added to the material in the mixer. A stable dispersion was formed with continued mixing at high speed for one minute.

A corn flake bar was made with the above dispersion, as follows: 34.8 parts of the above dispersion was mixed with 65.2 parts of corn flakes in a Hobart mixer. The materials were mixed at No. 3 speed for two minutes. 30 gram units were placed into a 2" x 4" mold and subjected to 250 p.s.i. pressure. After removal from the mold, the bars were palatable and could be eaten "as is" or broken up and added to water.

The bar contained four calories per gram and 7.9% water.

A second bar was made with the same dispersion as a binder in the ratio of one part binder to one part corn flakes. The same procedure was followed. The resulting food bar contained 4.5% moisture and 4.4 calories per gram following drying in a hot air dryer.

EXAMPLE III

A binder formulation was made as follows:

|  | Percent |
|---|---|
| Nonfat milk solids | 25.8 |
| Lard flakes | 25.8 |
| Sucrose | 25.8 |
| Glycerin | 6.5 |
| Water | 16.1 |

A stable dispersion was formed by melting the lard flakes at 160° F. The nonfat milk solids, sugar and melted lard were mixed in a Waring Blendor. The glycerin-water solution was added and mixing continued for one minute at high speed.

The dispersion formed was mixed with various edible particles in the ratio of one part dispersion to one part edible particles. The mixture was compressed into food bars using the procedure stated in Example II. The bars were dried to 4.5% moisture in an air-circulating oven. The following table shows the calories per gram and the percent fat in the resulting food bars:

TABLE I

| Food bar | Calories per gram | Percent fat |
|---|---|---|
| Corn flake | 4.4 | 13.8 |
| Wheat flake | 4.4 | 14.8 |
| Rice | 4.4 | 14.0 |
| Oat | 4.5 | 17.4 |
| Graham cracker | 4.5 | 18.1 |

Each of the bars was palatable when eaten "as is" or when broken up and added to ½ cup water.

EXAMPLE IV

A binder was made using a higher percentage of fat and using sodium caseinate as the film-former. The formulation was as follows:

|  | Percent |
|---|---|
| Lard flakes | 35.7 |
| Distilled water | 28.6 |
| Sucrose | 22.5 |
| Sodium caseinate | 8.6 |
| Glycerin | 4.6 |

A one to one mixture of the binder, with different edible particles was made into bars and dried to 4.5% moisture. The mixing molding procedure was the same as used in Example II. The bars produced are summarized in Table II:

TABLE II

| Food bar | Carolies per gram | Percent fat |
|---|---|---|
| Corn flake | 4.7 | 20.2 |
| Wheat flake | 4.7 | 21.5 |
| Rice Krispies | 4.7 | 20.5 |
| Oat | 4.9 | 24.1 |
| Graham cracker | 4.9 | 25.9 |

Each of the bars was palatable when eaten "as is" or when broken up and added to ½ cup water.

EXAMPLE V

The binder formulation of Example IV was used to make a hash bar, having the following formulation:

|  | Percent |
|---|---|
| Binder | 38.6 |
| Potato flakes | 38.4 |
| Dried gravy mix | 13.8 |
| Dried beef (oil immersion dried) | 8.2 |
| Onion flakes | 1.0 |

The above ingredients were mixed together in a Hobart mixer at high speed for about two minutes. Food bars were made following the procedure stated in Example II. The bars were dried to 4.5% moisture, and contained 4.6 calories per gram and 18.2% fat. The bar was palatable when eaten "as is" or when added to 1 cup of hot water.

EXAMPLE VI

A binder of the following formulation was made:

|  | Percent |
|---|---|
| Nonfat milk solids | 39 |
| Lard flakes | 29 |
| Glycerin | 7 |
| Distilled water | 25 |

The dispersion was made following the procedure stated in Example II.

A potato soup with beef bar was made using the following formulation:

|  | Percent |
|---|---|
| Binder | 50 |
| Potato flakes | 37.2 |
| Dried beef (oil immersion dried) | 9.2 |
| Onion flakes | 2.5 |
| Dried celery | 0.6 |
| Sodium chloride | 0.4 |
| Black pepper | 0.1 |

The ingredients were mixed together in a Hobart mixer for two minutes at high speed. 40 grams of the mixture was placed into a 2" x 4" die and 250 p.s.i. pressure was applied. After removal from the mold, the bars were dried to 4.5% moisture and were found to contain 4.5 calories per gram and 18.7% fat. The bar was palatable when eaten "as is" or when added to water.

EXAMPLE VII

A binder was made as follows:

|  | Percent |
|---|---|
| Nonfat milk solids | 21.4 |
| Lard flakes | 21.4 |
| Sucrose | 21.4 |
| Glycerin | 5.3 |
| Water | 30.5 |

The stable dispersion was formed by heating the lard flakes to 160° F. adding the sucrose and nonfat milk solids, and blending together until all the solids were coated with melted lard. 56½% of the water was added with the glycerin contained therein. The mixture was then mixed at high speed for one minute in a Waring Blendor. After the dispersion was formed, the remaining water was added to dilute the mixture for spray drying. The mixture was then spray dried as stated in Example I. The following composition resulted:

|  | Percent |
|---|---|
| Nonfat milk solids | 30.17 |
| Lard flakes | 30.17 |
| Sucrose | 30.17 |
| Glycerin | 7.59 |
| Water | 1.90 |

The above dry dispersion was made into bars having a formulation as stated in Example I. The procedure followed was the same as that of Example I. The bars that resulted are summarized in Table III:

TABLE III

| Food bar | Calories per gram | Percent fat | Percent moisture |
|---|---|---|---|
| Corn flake | 4.4 | 14.0 | 4.7 |
| Wheat flake | 4.4 | 14.5 | 4.8 |
| Rice krispies | 4.5 | 14.0 | 4.6 |
| Oat | 4.5 | 17.4 | 4.9 |
| Graham cracker | 4.5 | 19.0 | 5.8 |

All of the bars were palatable when eaten "as is" or when added to ½ cup water.

EXAMPLE VIII

The binder was made with the following formulation:

|  | Percent |
|---|---|
| Nonfat milk solids | 21.6 |
| Lard flakes | 21.4 |
| Sucrose | 6.9 |
| Water | 50.1 |

The dispersion was made following the procedure stated in Example I. The resulting dried binder was utilized to make a hash bar having the following formulation:

|  | Percent |
|---|---|
| Potato flakes | 40.4 |
| Binder | 30.0 |
| Dried gravy mix | 14.4 |
| Dried beef | 9.2 |
| Water | 5.0 |
| Dried onions | 1.0 |

All of the ingredients were mixed together in a Hobart mixer to comminute the particles. The Hobart mixer was then set at No. 2 speed and the water was slowly added while mixing continued. After a uniform mixture was obtained, 40 grams of the mixture was placed in a 2" x 4" mold and subjected to 500 p.s.i. pressure. The bars were dried to a moisture content of 8.2% and were found to contain 4.4 calories per gram and 15.4% fat. The bar was palatable when eaten "as is" or when added to water.

The same binder was used to make a potato soup with beef bar having the following formulation:

|  | Percent |
|---|---|
| Potato flakes | 43.6 |
| Binder | 38.0 |
| Dried beef | 9.2 |
| Water | 5.0 |
| Dried onion | 2.5 |
| Sodium chloride | 1.0 |
| Dried celery | 0.6 |
| Black pepper | 0.1 |

The same techniques were used in making the food bar that were used to make the hash bar described immediately above. The resulting bar contained 7.4% moisture, 4.5 calories per gram and 18.9% fat.

EXAMPLE IX

A binder was made with the following formulation:

|  | Percent |
|---|---|
| Sucrose | 26.67 |
| Durkex oil [1] | 21.33 |
| Nonfat milk solids | 21.33 |
| Water | 30.67 |

[1] A high stability soybean oil made by the Durkee Company, Chicago, Ill.

A dispersion was made following the procedure stated in Example I except that the dispersion was homogenized at 400 p.s.i. before spray drying. A stable, free flowing powder resulted.

A corn flake bar was made according to the formulation of Example IV. The bar was made by following the procedure of Example VII. The resulting bar was palatable when eaten "as is" or when added to ½ cup water. When added to water, no white scum or fat specks and no fat "mouth feel" were evident.

Another corn flake bar was made according to the formulation of Example IV. The bar was made by following the procedure of Example VII, except that 500 p.s.i. pressure was used instead of 125 p.s.i.

EXAMPLE X

A binder was made with the following formulation:

|  | Percent |
|---|---|
| Sucrose | 6.92 |
| Durkex oil | 21.43 |
| Nonfat milk solids | 21.57 |
| Water | 50.08 |

The constituents were mixed and spray dried according to the procedure stated in Example I, except that the dispersion was homogenized at 4000 p.s.i. before spray drying. The stable, white, free-flowing powders, resulting were used to make a hash bar, a potato soup with beef bar, and a split pea bar.

A hash bar was made according to the following formulation:

|  | Percent |
|---|---|
| Potato flakes | 43.0 |
| Binder | 35.5 |
| Dried beef | 8.2 |
| Dried gravy mix | 7.2 |
| Water | 5.0 |
| Dried onion flakes | 0.5 |
| Sodium chloride | 0.5 |
| Seasoning | 0.1 |

The dried beef was reduced in size by mixing in a Hobart mixer and then the potato flakes were added, followed by the seasoning and the binder. Mixing was continued at No. 2 speed for one minute. The water was then added and mixing continued until a uniform mixture was obtained. The product was made into 2" x 4" x ¼" bars weighing approximately forty grams. The pressure was 750 p.s.i. and the dwell time was five seconds. The bars were dried for twenty minutes in an air circulating oven at 50° C. The dried bars were packaged into Mylar-vinyl lined aluminum foil pouches. The bars contained 7.8% moisture, 4.4 calories per gram and 16.3% fat. The binder was used to make a potato soup with beef bar, according to the following formulation:

|  | Percent |
|---|---|
| Potato flakes | 45.2 |
| Binder | 39.4 |
| Dried beef | 8.2 |
| Water | 5.0 |
| Sodium chloride | 1.0 |
| Dried onion powder | 0.5 |
| Dried celery | 0.6 |
| Seasoning | 0.1 |

The bar was made according to the procedure stated immediately above, in connection with the hash bar. The bars contained 7.4% moisture, 4.4 calories per gram and 18.0% fat.

A split pea bar was made according to the following formulation:

|  | Percent |
|---|---|
| Binder | 46.8 |
| Split pea powder | 30.8 |
| Potato granules | 7.8 |
| Potato flakes | 7.8 |
| Water | 4.0 |
| Sodium chloride | 1.0 |
| Smoked yeast flour | 1.0 |
| Onion powder | 0.5 |
| Monosodium glutamate | 0.2 |
| Black pepper | 0.1 |

The procedure used for making the bar was the same as that stated immediately above, in connection with the hash bar, except the dwell time was 0.3 second instead of 5 seconds. The bars contained 7.1% moisture, 4.5 calories per gram and 20.9% fat.

A number of food bars were prepared for storage studies. The formulations are given in Examples XI, XII, XIII, and XIV. Bars were packaged in two different packages and stored in two distinct environments. The two different packages were:

(A) 0.5 mil Mylar—.00035 inch aluminum foil—3 mil vinyl (polyvinyl chloride) pouch stock.
(B) Glass jar, nitrogen packed.

Environment one was a 100° F. room which contained 50% relative humidity and a constant temperature. The second environment was a cycling room which varied from 76° F. and 74% relative humidity to 90° F. and 78% relative humidity. The temperature and relative humidity in the cycling room were constantly changing from one limit to the other. The product was removed from storage and tested at 2 weeks, 4 weeks, 8 weeks, 13 weeks, 26 weeks and 52 weeks. The bars were tested for appearance, smell, taste "as is," dispersibility in water, taste in a soup, and moisture content. The results of each of the tests are given in tables included with each of the Examples XI–XIV.

EXAMPLE XI

A binder formulation was prepared according to Example IX. Corn flake bars were made according to the following formulation:

|   | Percent |
|---|---|
| Binder | 45 |
| Corn flakes | 52 |
| Water | 3 |

The corn flakes were broken up in a Hobart mixer by mixing at No. 2 speed for 45 seconds. Water was added and then the binder was added and the constituents were mixed for 15 seconds. The bars were made by filling a 2″ x 4″ x ¼″ dies with 40 grams of material. 750 p.s.i. pressure was used. The bars were dried for 20 minutes in an air circulating oven at 50° C., packaged, and then placed in storage.

The results of the storage studies appear in Table IV.

EXAMPLE XII

A food bar was made using the binder of Example IX, according to the formulation of Example XI, except that wheat flakes were used in place of corn flakes. The food bars were packaged and placed in storage and the results appear in Table V.

EXAMPLE XIII

A rice krispie bar was made with the binder of Example IX and the following formulation:

|   | Percent |
|---|---|
| Binder | 45 |
| Rice krispies | 51 |
| Water | 4 |

The bars were made according to the procedure of Example XI, packaged and placed into storage. The results of the storage tests appear in Table VI.

EXAMPLE XIV

A graham cracker bar was made with the binder of Example IX and the following formulation:

|   | Percent |
|---|---|
| Binder | 45 |
| Graham cracker | 53 |
| Water | 2 |

The bars were made according to the procedure of Example XI, packaged and stored. The results of the storage tests appear in Table VII.

The hash bar of Example X and the potato soup with beef bar of Example X were also subjected to storage tests. The results of those tests appear in Tables VIII and IX, respectively.

TABLE IV.—STORAGE TESTS FOR CORN FLAKE BARS

| Test | 2 weeks | | 4 weeks | | 8 weeks | | 13 weeks | | 26 weeks | |
|---|---|---|---|---|---|---|---|---|---|---|
|  | 100° F. room | Cycling room | 100° F. room | Cycling room | 100° F. room | Cycling room | 100° F. room | Cycling room | 100° F. room | Cycling room |
|  | A | B | A | B | A | B | A | B | A | B |
| Appearance | OK | OK | OK | OK | OK | OK | OK | OK | OK | OK |
| Smell | OK | OK | OK | OK | OK | OK | OK | OK | OK | OK |
| Taste "as is" | OK | OK | OK | OK | OK | OK | OK | OK | OK | OK |
| Taste, gruel | OK | OK | OK | OK | OK | OK | (2) | OK | OK | OK |
| Dispersibility in water | OK | OK | OK | OK | OK | OK | OK | OK | OK | OK |
| Comments | Good | Good | Good | Good | Good | Good | Good | (3) | Good | Good |
| Percent water [1] | 3.98 | 4.21 | 3.96 | 3.87 | 3.42 | 3.50 | 4.03 | 5.60 | 3.89 | 3.61 |

[1] Moisture determined by drying 6 hours in a vacuum oven set at 26 inches of vacuum and 70° C.
[2] Slightly stale.
[3] Poor seal.

TABLE V.—STORAGE TESTS FOR WHEAT FLAKE BARS

| Test | 2 weeks | | 4 weeks | | 8 weeks | | 13 weeks | | 26 weeks | |
|---|---|---|---|---|---|---|---|---|---|---|
|  | 100° F. room | Cycling room | 100° F. room | Cycling room | 100° F. room | Cycling room | 100° F. room | Cycling room | 100° F. room | Cycling room |
|  | A | B | A | B | A | B | A | B | A | B |
| Appearance | OK | OK | OK | OK | OK | OK | OK | OK | OK | OK |
| Smell | OK | OK | OK | OK | OK | OK | OK | OK | OK | OK |
| Taste "as is" | OK | OK | OK | OK | OK | OK | OK | OK | OK | OK |
| Taste, gruel | OK | OK | OK | OK | OK | OK | OK | OK | OK | OK |
| Dispersibility in water | OK | OK | OK | OK | OK | OK | OK | OK | OK | OK |
| Comments | Good | Good | Good | Good | Good | Good | Good | Good | Good | Good |
| Percent water [1] | 4.20 | 3.49 | 4.38 | 3.53 | 3.57 | 3.13 | 3.62 | 3.43 | 3.40 | 3.42 |

[1] Moisture determined by drying 6 hours in a vacuum oven set at 26 inches of vacuum and 70° C.

TABLE VI.—STORAGE TESTS FOR RICE KRISPIE BARS

| Test | 2 weeks | | 4 weeks | | 8 weeks | | 13 weeks | | 26 weeks | |
|---|---|---|---|---|---|---|---|---|---|---|
| | 100° F. room | Cycling room | 100° F. room | Cycling room | 100° F. room | Cycling room | 100° F. room | Cycling room | 100° F. room | Cycling room |
| | A | B | A | B | A | B | A | B | A | B |
| Appearance | OK | OK | OK | OK | OK | OK | OK | OK | OK | OK |
| Smell | OK | OK | OK | OK | OK | OK | OK | OK | OK | OK |
| Taste "as is" | OK | OK | OK | OK | OK | OK | OK | OK | OK | OK |
| Taste, gruel | OK | OK | OK | OK | OK | OK | OK | OK | OK | OK |
| Dispersibility in water | OK | OK | OK | OK | OK | OK | OK | OK | OK | OK |
| Comments | Good | Good | Good | Good | Good | Good | Good | Good | Good | Good |
| Percent water [1] | 4.36 | 3.91 | 4.71 | 4.61 | 4.19 | 3.85 | 4.23 | 4.48 | 4.57 | 4.70 |

[1] Moisture determined by drying 6 hours in a vacuum oven set at 26 inches of vacuum and 70° C.

TABLE VII.—STORAGE TESTS FOR GRAHAM CRACKER BARS

| Test | 2 weeks | | 4 weeks | | 8 weeks | | 13 weeks | | 26 weeks | |
|---|---|---|---|---|---|---|---|---|---|---|
| | 100° F. room | Cycling room | 100° F. room | Cycling room | 100° F. room | Cycling room | 100° F. room | Cycling room | 100° F. room | Cycling room |
| | A | B | A | B | A | B | A | B | A | B |
| Appearance | OK | OK | OK | OK | OK | OK | OK | OK | OK | OK |
| Smell | OK | OK | OK | OK | OK | OK | OK | OK | OK | OK |
| Taste "as is" | OK | OK | OK | OK | OK | OK | OK | OK | OK | OK |
| Taste, gruel | OK | OK | OK | OK | OK | OK | OK | OK | OK | OK |
| Dispersibility in water | OK | OK | OK | OK | OK | OK | OK | OK | OK | OK |
| Comments | Good | Good | Good | Good | Good | Good | Good | Good | Good | Good |
| Percent Water [1] | 2.85 | 3.78 | 3.16 | 3.16 | 3.00 | 3.24 | 2.87 | 3.40 | 3.87 | 3.40 |

[1] Moisture determined by drying 6 hours in a vacuum oven set at 26 inches of vacuum and 70° C.

TABLE VIII.—STORAGE TESTS FOR HASH BARS

| Test | 2 weeks | | 4 weeks | | 6 weeks | | 13 weeks | |
|---|---|---|---|---|---|---|---|---|
| | 100° F room | Freezer | 100° F room | Freezer | 100° F room | Freezer | 100° F room | Freezer |
| | A | B | A | B | A | B | A | B |
| Appearance | OK | OK | OK | OK | OK | OK | OK | OK |
| Smell | OK | OK | OK | OK | OK | OK | OK | OK |
| Taste "as is" | OK | OK | OK | OK | OK | OK | OK | OK |
| Taste, gruel | OK | OK | OK | OK | OK | OK | OK | OK |
| Dispersibility in water | OK | OK | OK | OK | OK | OK | OK | OK |
| Percent water in bars [1] | 3.94 | 3.99 | 3.99 | 4.12 | 4.13 | 3.98 | 3.98 | 4.05 |
| Comments | Good | Good | Good | Good | Good | Good | Good | Good |
| Seasoning | Good | Good | Good | Good | OK | Good | OK | Good |
| Percent water in seasoning [1] | 3.77 | 3.83 | 4.01 | 4.12 | 3.79 | 3.96 | 3.87 | 4.00 |

[1] Moisture determined by drying 6 hours in a vacuum oven set at 26 inches of vacuum and 70° C.

TABLE IX.—STORAGE TESTS FOR POTATO SOUP WITH BEEF BARS

| Test | 2 weeks | | 4 weeks | | 6 weeks | | 13 weeks | |
|---|---|---|---|---|---|---|---|---|
| | 100° F room | Freezer | 100° F room | Freezer | 100° F room | Freezer | 100° F room | Freezer |
| | A | B | A | C | A | B | A | C |
| Appearance | OK | OK | OK | OK | OK | OK | OK | OK |
| Smell | OK | OK | OK | OK | OK | OK | OK | OK |
| Taste "as is" | OK | OK | OK | OK | OK | OK | OK | OK |
| Taste, soup | OK | OK | OK | OK | OK | OK | OK | OK |
| Dispersibility in water | OK | OK | OK | OK | OK | OK | OK | OK |
| Percent water in bars [1] | 4.43 | 4.25 | 4.29 | 4.35 | 4.45 | 4.40 | 4.39 | 4.41 |
| Comments | Good | Good | Good | Good | Good | Good | Good | Good |
| Seasoning | Good | Good | Good | Good | Good | Good | Good | 1.09 |
| Percent water in seasoning [1] | 0.91 | 0.96 | 1.04 | 0.99 | 1.04 | 1.03 | 0.85 | Good |

[1] Moisture determined by drying 6 hours in a vacuum oven set at 26 inches of vacuum and 70° C.

EXAMPLE XV

A binder was made with the following formulation:

| | Percent |
|---|---|
| Lactose | 15.14 |
| Durkex oil | 5.71 |
| Sodium caseinate | 7.61 |
| Water | 71.54 |

The Durkex oil was heated to 150° F. and placed into a Waring Blendor. The sodium caseinate was added to the oil and 60% of the water was added at 140° F. Mixing continued for one minute at high speed. The lactose, dissolved in the remainder of the water, was then added. The material was sprayed with a Bowen spray dryer with a chamber temperature of 180° F. A white free-flowing powder resulted.

A food bar was made according to the following formulation:

| | Percent |
|---|---|
| Freeze dried scrambled eggs | 70 |
| Binder | 25 |
| Water | 5 |

The constituents were thoroughly mixed and pressed into a 2" x 4" x ½" mold under 250 p.s.i. pressure.

EXAMPLE XVI

The spray dried binder of Example XV was also used in the following formulation:

| | Percent |
|---|---|
| Fried bacon pieces | 70 |
| Binder | 25 |
| Water | 5 |

Acceptable bars were made according to the procedure of Example XV.

EXAMPLE XVII

Dried fish bars were made with the binder of Example XV, according to the following formulation:

| | Percent |
|---|---|
| Dried smoked herring | 70 |
| Binder | 25 |
| Water | 5 |

The herring was broken into small pieces in a Waring Blendor and then placed into a Hobart mixer. The water was added slowly and then the binder was added with continued mixing. After a uniform mixture was obtained, the product was prepared into bars that were very satisfactory.

EXAMPLE XVIII

A binder was made according to the following formulation:

| | Percent |
|---|---|
| Sucrose | 3.21 |
| Durkex oil | 21.61 |
| Sodium caseinate | 8.81 |
| Lactose | 7.66 |
| Corn starch | 4.59 |
| Water | 54.12 |

The Durkex oil was heated to 150° F. and placed into a Waring Blendor. The sucrose, starch and sodium caseinate were added and coated with Durkex oil. Sixty percent of the water at 150° F. was added with high speed mixing and the mixing continued for 1½ minutes. The lactose was dissolved in the balance of the water and added. Mixing continued for one minute at high speed. The dispersion was spray dried (Bowen) with a chamber temperature of 170° F. A white free-flowing powder resulted.

Food bars were made according to the following formulation:

| | Percent |
|---|---|
| Roasted peanut pieces | 70 |
| Binder | 25 |
| Water | 5 |

The peanuts were chopped in a Waring Blendor and screened. Only particles smaller than No. 7 mesh (U.S. Sieve Series) were used. The particles were placed in a Hobart mixer and the water added slowly while mixing at No. 2 speed. The binder was added and mixing continued for 30 seconds. Bars were made and dried 20 minutes in an air circulating oven at 50° C. The resulting bars were acceptable.

EXAMPLE XIX

A food bar was made using the binder of Example XVIII, with the following formulation:

| | Percent |
|---|---|
| Raisins | 70 |
| Binder | 25 |
| Water | 5 |

Water was added to the raisins in a Hobart mixer and the raisins were mixed by hand to thoroughly wet their surface. The binder was added and mixing was continued for 15 seconds at No. 1 speed of the Hobart N–50 mixer. 80 gram portions were placed into a 2″ x 4″ x ½″ mold and a minimum pressure was used. The resulting bars were dried at 120° F. for 20 minutes. The bars had an odor and flavor typical of raisins. They had a hardness such that both shearability by human incisors and chewability was good at 35, 70 and 100° F. Each of the bars survived about ten 6 foot drops on a hard surface before breaking.

EXAMPLE XX

The binder of Example XVIII was used to make food bars according to the following formulation:

| | Percent |
|---|---|
| Freeze dried chicken | 62.50 |
| Binder | 20.83 |
| Glycerin | 2.67 |
| Water | 14.00 |

The chicken was weighed into a 12 quart bowl and mixed at No. 2 speed in a Hobart mixer for one minute. The binder was added and mixing continued for 30 seconds. The glycerin-water solution was added and mixing continued for one minute. 120 bars at 2″ x 4″ x ½″ were made using 750 p.s.i. pressure and a dwell time of 10 seconds. The bars were then removed from the press and dried for 3½ hours at 120° F. The resulting bars were of a considerable hardness and did not break when subjected to the 6 foot drop test, until the fourth drop.

EXAMPLE XXI

The binder of Example XVIII was used to make a food bar according to the following formulation:

| | Percent |
|---|---|
| Dried peaches | 71 |
| Binder | 25 |
| Water | 5 |

The dried peach halves were chopped, using a Waring Blendor and water was added to the chopped peach halves whiel mixing at No. 2 speed. The binder was added and mixing continued until a uniform mixture was obtained. 120 bars 2″ x 4″ x ½″ were made by utilizing a pressure of 312.5 p.s.i. and a dwell time of 10 seconds. The bars were dried for 30 minutes at 120° F. The resulting bars were of an acceptable hardness and did not break when subjected to the 6 foot drop test until the 11th drop.

EXAMPLE XXII

Food bars were made with the binder of Example XVIII and the following formulation:

| | Percent |
|---|---|
| Pregelatinized tapioca starch | 65 |
| Binder | 22 |
| Water | 13 |

The starch and the binder were mixed together and after a uniform mixture was obtained, water was added. 2″ x 4″ x ½″ food bars were made under 500 p.s.i. and ½ second dwell time. The resulting bars were of an acceptable hardness for chewing and did not break when subjected to the 6 foot drop test until the 35th drop.

It may be seen by reference to Tables I–IX that bars made according to the foregoing examples displayed satisfactory storage properties when packaged as indicated and stored under the indicated conditions. In general, the majority of bars can be stored for 13 weeks at 100° F. and 50% relative humidity and under cyclic conditions.

EXAMPLE XXIII

A binder formulation was made as follows:

| | Percent |
|---|---|
| Sodium caseinate | 6.8 |
| Cottonseed oil | 54.4 |
| Sucrose | 3.4 |
| Glycerin | 1.4 |
| Water | 34.0 |

The stable dispersion is formed by placing the water in a Waring Blendor, adding the sodium caseinate and whipping until the sodium caseinate is hydrated and a large amount of air is incorporated. The sucrose and glycerin are added with continued mixing. The cottonseed oil is then added and a stable dispersion is formed with continued mixing at high speed for one minute. This material is spray dried using a Bowen spray drier at an inlet air temperature of 170° F. and an outlet air temperature of 130° F. A white free-flowing powder results with the following composition:

| | Percent |
|---|---|
| Sodium caseinate | 10 |
| Cottonseed oil | 80 |
| Sucrose | 5 |
| Glycerin | 2 |
| Water | 3 |

A vanilla flavored bar is made with the above dispersion, as follows: 96.75 parts of the above dispersion plus 3 parts water is mixed with .25 part of vanilla extract in a Hobart mixer. The materials are mixed at No. 3 speed for two minutes. Thirty gram units are placed into a 2″ x 4″ mold and subjected to 250 p.s.i. pressure. After removal from the mold, the bars are palatable and could be eaten "as is" or broken up and added to water.

EXAMPLE XXIV

A binder formulation was made as follows:

| | Percent |
|---|---|
| Nonfat milk solids | 20 |
| Cottonseed oil | 10 |
| Sucrose | 15 |
| Glycerin | 5 |
| Water | 50 |

The stable dispersion is formed by placing the cottonseed oil in a Waring Blendor, adding the nonfat milk solids and sucrose and mixing. The glycerin is dissolved in water and the solution is added to the material in the mixer. A stable dispersion is formed with continued mixing at high speed for one minute.

A corn flake bar is made with the above dispersion, as follows: 20 parts of the above dispersion is mixed with 77 parts corn flakes and 3 parts water in a Hobart mixer. The materials are mixed at No. 3 speed for two minutes. Thirty gram units are placed into a 2″ x 4″ mold and subjected to 250 p.s.i. pressure. After removal from the mold, the bars are palatable and could be eaten "as is" or broken up and added to water.

The bars were tested for strength, brittleness and sturdiness by dropping the bar through a free fall of 6 feet to a concrete floor. The number of the drops in which the bar broke or shattered was recorded. In general, the bars had sufficient hardness to withstand 10 such drops. It was found that the hardness can be adjusted by varying the following:

(1) The amount of glycerin added,
(2) the pressure applied,
(3) the particle size of the ingredients, and
(4) moisture content during application of pressure.

By varying the above in the ranges shown generally in the examples, a wide range of hardness and bar density may be obtained. In general, the preferred density of the food bar is 0.5 to 1.0 gm. per cc.

EXAMPLE XV

Food bars are made as described in Examples I–XXIV but without the edible food particles dispersed therethrough. The resulting bars are very high in caloric content, have satisfactory strength and also have satisfactory taste and texture when eaten.

Although the invention has been described with particular reference to a rectilinear shaped bar, those skilled in the art will readily recognize that it applies with equal force to a cylindrical configuration such as a tablet. It may also take other physical shapes such as a sheet. And, of course, the edible particles and binder may be formed into an irregular shape such as a shape chosen to conform to a given irregular space in a soldier's food packet.

Having thus described the invention, the following is claimed:

It is claimed:

1. A process for forming a compact food unit from edible particles and edible fat, a hydrophilic film former and water which comprises; mixing said edible particles, fat, film former and water for a time sufficient to form a dispersion which will not release its fat when one drop of said dispersion is placed into 250 ml. of water at a temperature of 140° F., said edible particles being present in an amount ranging from about 0.25 to 80% of the total food unit weight, said fat, film former and water providing an edible binder for said edible particles and being present therein in an amount ranging from about 20 to 99.75% by weight of the food unit with the fat comprising about 10 to about 80% of the binder weight and the film former from about 5% to 90% of the dry weight of the binder; drying said dispersion to a moisture content not greater than 10% of the total weight of said mixture; subjecting said dispersion to a pressure of 250–750 p.s.i. in a confined mold and releasing said pressure and removing said dispersion from said mold.

2. A process for forming a compact food unit from edible particles, edible fat, hydrophilic film former and water which comprises; forming a binder by mixing said fat, hydrophilic film-former and water which comprises, forming a binder by mixing said fat in an amount ranging from about 5 to 90% of the dry weight of the binder, film former in an amount ranging from about 10 to about 80% of the binder weight and water for a time sufficient to form a dispersion of oil in said film former and water suspension that will not release its fat when one drop of said binder is placed into 250 ml. of water at a temperature of 140° F.; drying said binder; mixing said dry binder with edible particles and moisture; subjecting said binder and edible particles to a pressure of 250–750 p.s.i. in a confined mold and releasing said pressure and removing said binder and edible particles from said mold to thereby form said compact food unit.

3. The process of claim 2 wherein said edible particles are provided in a quantity that is 30–70% of the weight of said compact food unit, said fat and film former are provided in a range of relative quantities of 4 parts fat; 1 part film former to 2 parts fat; 3 parts film former and said drying of said binder consists of spray drying.

4. The process according to claim 3 wherein said moisture is present in an amount less than about 5% by weight of the food unit.

5. The process according to claim 1 wherein at least a portion of said moisture is removed after release from a mold.

6. The process according to claim 1 wherein said edible oil film-former and water are mixed together prior to the admixture of said edible particles.

7. The process according to claim 3 wherein the edible particles and the spray-dried binder are mixed with water in an amount sufficient to cause the binder surface to become tacky.

8. A compact, solid food unit comprising:
(a) an edible binder in an amount ranging from about 20% to 99.75% by weight of the food unit, said binder being characterized as having a discontinuous phase of fat globules in an amount ranging from about 10 to about 80% of the binder weight and continuous phase containing water and a hydrophilic film former in an amount ranging from about 5% to 90% of the dry weight of the binder with said continuous phase encapsulating said discontinuous phase of fat globules, and
(b) discrete edible food particles in an amount ranging from 0.25 to 80% of the total food unit weight uniformly distributed throughout said food unit and supported therein by said binder, said food unit being further characterized as containing from 2% to less than 10% water by weight and possessing a hard but frangible structure with water-dispersible properties.

9. The food unit according to claim 8 wherein the edible particle is a nutritive food particle in an amount of at least 10% by weight of the food unit.

10. The food unit according to claim 9 wherein the amount of edible particle contained in the food unit ranges from about 30 to about 75% by weight, the hydrophilic film former comprising between 15 and 35% of the binder weight and the fat to film former weight ratio ranges from 4:1 to 1:8.

11. The food unit according to claim 10 wherein the density of the food unit ranges from 0.5 to 1.0 gram per cubic centimeter.

12. The food unit according to claim 11 wherein the amount of water therein ranges from about 2 to about 6% by weight.

References Cited

UNITED STATES PATENTS

| | | | |
|---|---|---|---|
| 2,278,466 | 4/1942 | Musher | 99—1 |
| 2,447,427 | 8/1948 | Oftedahl | 99—108 |
| 2,964,409 | 12/1960 | Sair | 99—109 |
| 3,023,104 | 2/1962 | Battista | 99—1 |
| 3,323,922 | 6/1967 | Durst | 99—123 X |

MAURICE W. GREENSTEIN, *Primary Examiner.*

U.S. Cl. X.R.

99—28, 83, 107, 111, 124, 139

PO-1050
(5/69)

UNITED STATES PATENT OFFICE
CERTIFICATE OF CORRECTION

Patent No. 3,431,112      Dated March 4, 1969

Inventor(s) Jack R. Durst

It is certified that error appears in the above-identified patent and that said Letters Patent are hereby corrected as shown below:

In the specification of the subject patent, applicant inadvertently used the registered trademark RICE KRISPIES, owned by Kellogg Company, Battle Creek, Michigan, in a non-trademark sense. The patent is hereby corrected to cause each occurrence of "rice krispies" and "rice krispie" (column 2, line 23; column 4, line 42; column 5, Table II, line 61; column 6, Table III, line 73; column 10, lines 16 and 21; and columns 11-12, line 1) to read - - oven toasted rice cereal (Rice Krispies Brand) - - .

SIGNED AND
SEALED
MAY 26 1970

(SEAL)
Attest:

Edward M. Fletcher, Jr.
Attesting Officer

WILLIAM E. SCHUYLER, JR.
Commissioner of Patents